United States Patent
Auger

(10) Patent No.: US 11,173,646 B2
(45) Date of Patent: Nov. 16, 2021

(54) METHOD FOR ASSISTING IN THE PROGRAMMING OF AN ELECTRONIC CONTROL UNIT OF A FORMING STATION

(71) Applicant: SIDEL PARTICIPATIONS, Octeville-sur-Mer (FR)

(72) Inventor: Julien Auger, Octeville-sur-Mer (FR)

( * ) Notice: Subject to any disclaimer, the term of this patent is extended or adjusted under 35 U.S.C. 154(b) by 0 days.

(21) Appl. No.: 16/629,712

(22) PCT Filed: Jul. 9, 2018

(86) PCT No.: PCT/EP2018/068558
§ 371 (c)(1),
(2) Date: Jan. 9, 2020

(87) PCT Pub. No.: WO2019/011865
PCT Pub. Date: Jan. 17, 2019

(65) Prior Publication Data
US 2020/0171736 A1    Jun. 4, 2020

(30) Foreign Application Priority Data
Jul. 10, 2017   (FR) ....................................... 1756503

(51) Int. Cl.
*B29C 49/78*   (2006.01)
*B29C 49/36*   (2006.01)
(Continued)

(52) U.S. Cl.
CPC ........ *B29C 49/4823* (2013.01); *B29C 45/374* (2013.01); *B29C 49/06* (2013.01);
(Continued)

(58) Field of Classification Search
CPC .. B29C 49/36; B29C 49/78; B29C 2049/4871
See application file for complete search history.

(56) References Cited

U.S. PATENT DOCUMENTS

| 6,113,841 A * | 9/2000 | Nielsen ................... B29C 49/78 |
| | | 264/540 |
| 2014/0004219 A1* | 1/2014 | Cirette ..................... B29C 49/42 |
| | | 425/188 |
| 2015/0145179 A1 | 5/2015 | Finger |

FOREIGN PATENT DOCUMENTS

| EP | 2236268 A2 | 10/2010 | |
| EP | 2604412 A2 * | 6/2013 | ............ B29C 49/78 |
| WO | WO2012052836 A1 | 4/2012 | |

OTHER PUBLICATIONS

International Search report for PCT/EP2018/068558 dated Sept. 6, 2018.

* cited by examiner

*Primary Examiner* — Robert B Davis

(57) ABSTRACT

The invention relates to a method for assisting in the programming of an electronic control unit of a forming station comprising molding units, each of which has an interchangeable mold, the method comprising a manual programming step consisting in selecting a value for determined operating parameters through a data entry interface in the electronic control unit, wherein each mold has fastened thereto a storage component having values compatible with each mold for each determined parameter, is attached to said mold, the method comprising a prior step of reading the values stored in the storage component by means of a reader which automatically transmits the values to the electronic control unit to limit the choice of values of each parameter to the compatible values.

12 Claims, 2 Drawing Sheets

(51) Int. Cl.
*B29C 49/48* (2006.01)
*B29C 45/37* (2006.01)
*B29C 49/06* (2006.01)
*G06K 7/14* (2006.01)

(52) U.S. Cl.
CPC .............. *B29C 49/36* (2013.01); *B29C 49/78* (2013.01); *G06K 7/1417* (2013.01); *B29C 2049/4858* (2013.01); *B29C 2049/4897* (2013.01)

METHOD FOR ASSISTING IN THE PROGRAMMING OF AN ELECTRONIC CONTROL UNIT OF A FORMING STATION

TECHNICAL FIELD OF THE INVENTION

The invention relates to a method for assisting with the programming of an electronic control unit of a forming station comprising molding units each of which bears an interchangeable mold for producing containers, in particular bottles made of thermoplastic, by blow molding preforms.

TECHNICAL BACKGROUND OF THE INVENTION

In the field of manufacture of containers made of thermoplastic, it is known to obtain the final container by forming, and especially blow molding, hot preforms. To obtain containers having characteristics suitable for the nature of the product that they must contain, the forming process is different for each type of container.

For example, the manufacture by forming of containers intended to receive cold water requires the use of cooled molds that allow the definitive shape thereof to be inexpensively and rapidly obtained.

In contrast, such a process is not applicable when the container must be filled with a hot liquid. Specifically, the walls of a container produced using such a process retract when they are heated by the liquid. To avoid this drawback, it is necessary to keep the molds at a defined temperature that is higher than the ambient temperature during the forming process.

Likewise, certain processes for manufacturing containers having a wall of very small thickness require the base of the mold to be moved during the forming operation in order to obtain a sufficiently thin base by stretching the thermoplastic.

Yet other manufacturing processes are also known for manufacturing suitable containers depending on the nature of the liquid to be received. Each of these processes requires a suitable mold and a machine capable of employing this mold. Furthermore, each process requires many operating parameters to be selected, these parameters generally being chosen or at the very least supervised by a human operator.

Moreover, machines for manufacturing containers, especially bottles made of thermoplastic, have a very high financial cost. Container manufacturers therefore want a multipurpose machine that allows many types of containers to be produced.

However, such a multipurpose machine is extremely complex to program. Many parameters must be selected or controlled by a human operator.

To limit human error, it has already been proposed to apply predefined recipes depending on the type of container to be manufactured. However, this solution is not entirely satisfactory because it does not allow the operating parameters to be finely adjusted. Furthermore, this solution does not allow errors such as leaving a mold intended for another type of container in the forming, and especially blow-molding or stretch-blow-molding, station to be avoided.

Furthermore, this solution generally involves a complex database, which is often remotely located, in order to allow the operating parameters of the machine to be computed. However, such a database is expensive. In addition, such a database is complex to update in light of the type of technological changes and improvements that regularly appear.

Moreover, it is known to equip molds with data media such as in document WO2012052836 which describes an apparatus for manufacturing a container obtained by blow molding from a preform comprising identifying means placed on the mold in order to Identify the type of final container and control means for controlling the mold open when the value of the final forming pressure inside the final container has been reached.

In addition, document EP2236268 describes a data medium, such as an RFID antenna or a barcode, placed on the mold and defining a geometric property of the final container, and a sensing device for detecting a characteristic value of the geometry of the preform to be formed.

Document US2015145179 describes a system for automatically changing mold comprising an arm and a loading system arranged on the machine for manufacturing containers.

BRIEF SUMMARY OF THE INVENTION

The invention provides a method for assisting with the programming of an electronic unit for controlling a forming station, the forming station comprising molding units each of which bears an interchangeable mold for producing containers, especially bottles made of thermoplastic, by blow molding preforms, the method comprising a manual programming step consisting in selecting a value for defined operating parameters via an interface for inputting data into the electronic control unit, characterized in that to each mold is fastened a means for permanently storing data comprising values compatible with said mold for each defined parameter, the method comprising a prior step of reading the values stored in the storage means using a reader that automatically transmits said values to the electronic control unit in order to limit the choice of values of each parameter to compatible values.

Thus, human errors are limited. This solution is particularly simple and inexpensive because it does not require the presence of an additional database.

According to other features of the assisting method:
the storage means is a multidimensional physical element that is borne by the mold and that is capable of being read by an optical reader;
the storage means is a two-dimensional barcode that is borne by the mold and that is capable of being read by an optical reader;
the storage means is a code according to the standard "GS1 DataMatrix ECC200";
the reader is arranged on the forming station;
the stored values are read by the reader when the mold is installed in the forming station.

The invention also relates to a molding unit for implementing the method according to the teachings of the invention, the molding unit comprising at least two shells and at least two shell-holders that each demountably receive one of the shells, each shell having:
an internal face comprising one segment of an impression of the container,
a top face containing a passage that opens into the impression of the container and that is intended to let a neck of the container pass,
an external face intended to be accommodated against a shell-holder,
characterized in that the storage means two-dimensional bar) borne by at least one shell, said code being arranged on a face of a visible portion of the shell that protrudes from the associated shell-holder when the shell-holder is accommodating said shell.

This location reserved for the two-dimensional barcode is particularly advantageous because it is visible even when the shell is mounted on the associated molding unit.

According to other features of the mold:
- the two-dimensional barcode is formed by a square matrix array of pixels that is divided horizontally into two horizontally juxtaposed half squares;
- the two-dimensional barcode is printed onto a label that is adhesively bonded to said top zone of the shell;
- the two-dimensional barcode is produced by altering the surface of the shell;
- the two-dimensional barcode is etched into the surface of the mold.

BRIEF DESCRIPTION OF THE FIGURES

Other features and advantages of the invention will become apparent on reading the following detailed description, which will be better understood with reference to the appended drawings, in which.

DETAILED DESCRIPTION OF THE FIGURES

In the rest of the description, elements that have an identical structure or analogous functions will be referenced with the same reference.

In the rest of the description, nonlimitingly, longitudinal orientations will be directed from back to front, vertical orientations will be directed from bottom to top and transverse orientations will be directed from left to right, these orientations being indicated by the coordinate system "L,V, T" in the figures. The vertical orientation is used by way of geometrical reference and has no relation to the direction of gravity.

Figure 1:
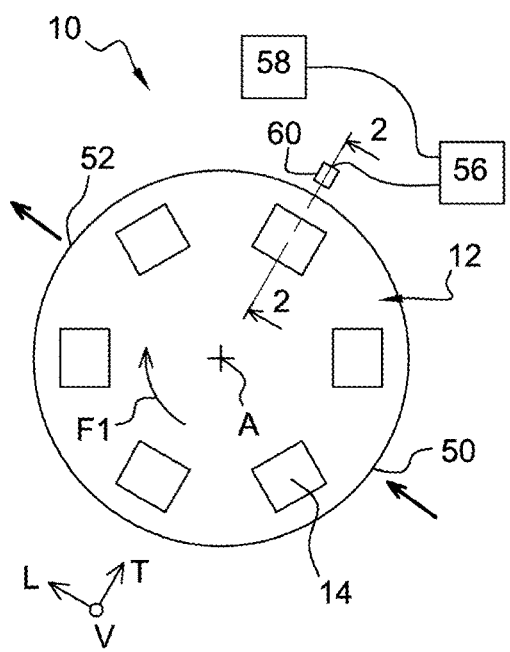
FIG. 1 is a top view that schematically shows a forming station that is able to implement the method according to the teachings of the invention.

FIG. 1 schematically shows a station 10 for forming in series containers, especially bottles, made of thermoplastic from preforms. The forming station 10 is intended to form part of a machine for mass producing containers, one comprising a heat-treating station for example.

The forming station 10 comprises a carousel 12 that is able to rotate about a vertical axis "A". The carousel 12 here rotates in a clockwise direction as indicated by the arrow "F1". The carousel 12 bears a plurality of molding units 14 that are regularly distributed on its periphery.

Figure 2:
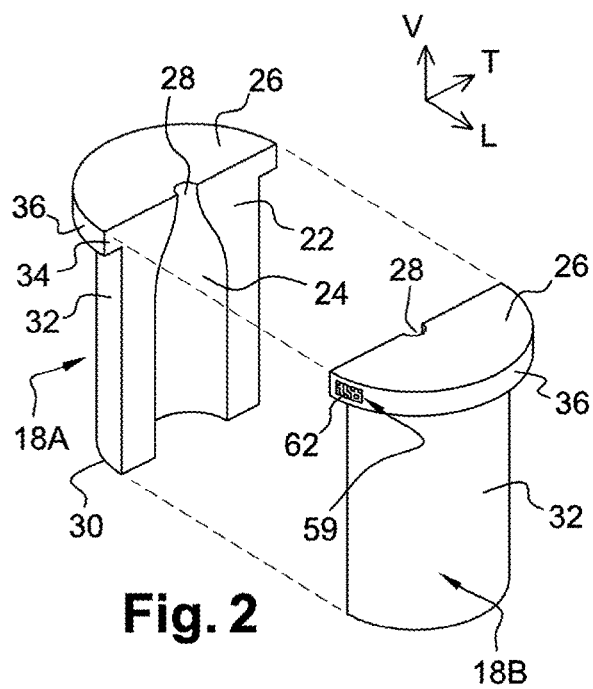
FIG. 2 is a view in vertical cross section cut along the sectional piano 2-2 of FIG. 1, which shows a molding unit equipped with a mold produced according to the teachings of the invention.

As is shown in FIG. 2, each molding unit 14 comprises a mold 16. The mold 16 comprises a plurality of molding shells 18A, 18B, which here are two in number, and which are each held by a shell-holder 20A, 20B.

Figure 3:
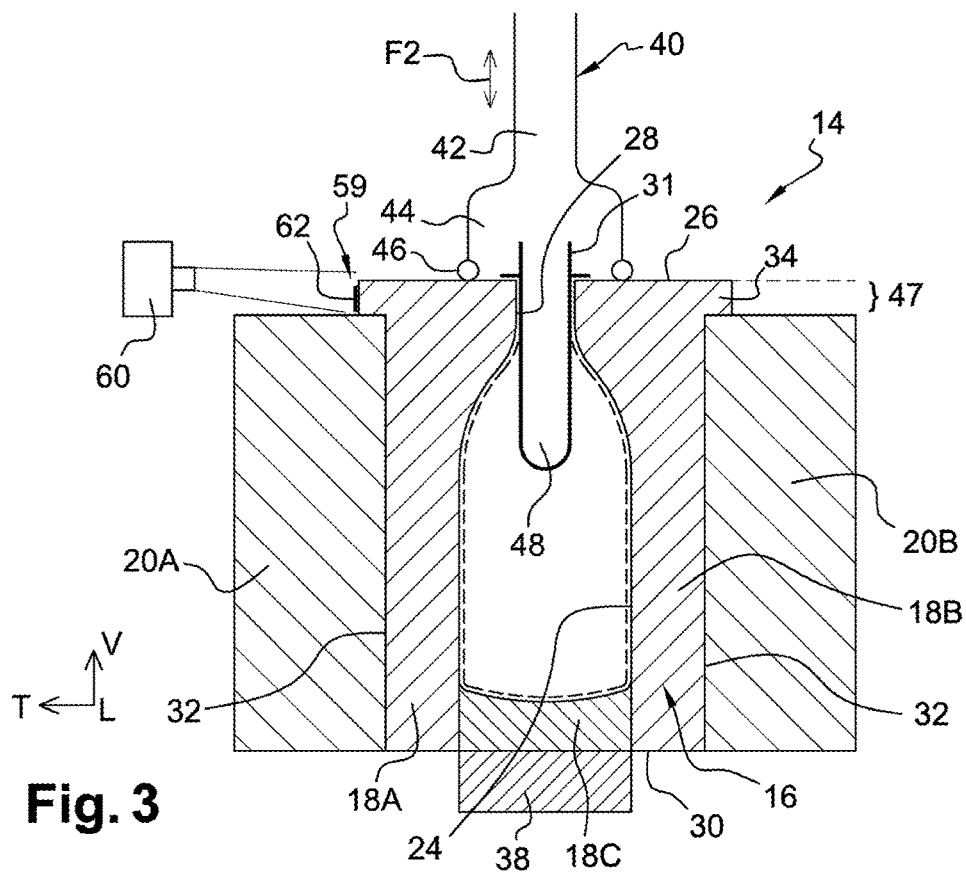
FIG. 3 is a perspective view that shows two shells of a mold one of which is equipped with a two-dimensional barcode produced according to the teachings of the invention.

The two melding shells 18A, 18B have been shown in more detail in FIG. 3. Each molding shell 18A, 18B has a hemicylindrical shape of vertical axis. Each shell 18A, 18B especially has a vertical internal face 22, which here is planar, comprising one portion of an impression 24 of the container to be obtained after forming. A horizontal top face 26 contains a top passage 28 that opens into the impression 24 of the container and that is intended to let a neck 31 of the container pass, as is illustrated in FIG. 2. The impression 24 here also opens onto a bottom face 30. Each shell 18A, 18B is furthermore bounded by a vertical external face 32, which here is of hemicylindrical shape, intended to be accommodated against the corresponding shell-holder 20A, 20B.

The two shells 18A, 18B are intended to be joined via their internal faces 22 in order to form the impression 24 of the container.

Each shell 18A, 18B furthermore has a top rim 34 that protrudes radially with respect to the external face 32 and which lies in the extension of the top face 26. The rim 34 is bounded radially by a vertical annular face 36.

As shown in FIG. 2, the shells 18A, 18B are here completed by a base 18C that is arranged in the orifice opening onto the bottom face 30. The base 18C bounds at the bottom the impression 24 of the container. The base 18C is held by a holder 38.

The shell 18A, 18B and the base 18C thus bear the impression 24 of the container whereas the shell-holders 20A, 20B and the base holder 38 are equipped with means (not shown) for cooling the impression 24. It is for example a question of a circuit through which a heat-transfer fluid flows.

Each shell 18A, 18B is intended to be removably held by the corresponding shell-holder 20A, 20B, whereas the shell-holders 20A, 20B are fastened to holding elements (not shown) that are hinged in order to allow the mold 16 to close. In this way, the shells 18A, 18B are interchangeable in each molding unit 14. Thus, when it is desired to change container model, only the shells 18A, 18B and the bass 18C are changed whereas the shell-holders 20A, 20B, which are elements that are very heavy, bulky and connected to a plurality of cooling ducts, remain in place on their holders. The change of impression is thus rapid and easy.

Each molding unit 14 is furthermore equipped with a blowing tube 14 that is mounted so as to be able to slide vertically with respect to the mold 16, as indicated by the arrow "F2" in FIG. 3. The tube 40 comprises a vertical duct 42 for supplying pressurized air, which opens at the bottom into a bell 44 that comprises a lower edge equipped with a seal 46. The tube 40 is mounted plumb with the top passage 28 of the mold 16 between an inactive high position in which the bell 44 is away from the mold 16 and an active lower position in which the bell 44 sealably covers a preform neck 31 that protrudes from the top passage 28 and that bears against the top face 26 of the shells 18A, 18B.

During the preparation of the forming station 10, the shells 13A, 18B with an impression of a given container model are firstly mounted on their shell-holders 20A, 20B. As shown in FIG. 2, the top rim 34 of each shell 18A, 18B allows the latter to be positioned so as to bear vertically against the associated shell-holder 20A, 20B. Thus, the rim 34 protrudes above the shell-holders 20A, 20B. As a result, one portion 47 of the faces of each shell 18A, 18B is visible from the exterior when said shell 18A, 18B is mounted on its shell-holder 20A, 20B. The visible portion 47 is here formed by the vertical annular face 36 and by the top face 26. The internal face 22 of the shell 18A, 18B does not form part of the visible portion 47 because it is covered by the other shell in joined position.

During the operation of the forming station 10, hot preforms 48 are individually conveyed to a point 50 of entry into the forming station 10. The preforms 48 are made of a thermoplastic such as PET (polyethylene terephthalate). Each preform 48 is positioned between the two shells 18A, 18B of a corresponding open mold 16 passing via the entry point 50. The two shells 18A, 18B are then closed so that the preform 48 is accommodated in the impression 24, a neck 31 of the preform 48 exiting from the mold 16 via the top passage 28. The preform 48 is kept in this position via abutment of a lip encircling the neck 31 against the perimeter of the passage 28. This operation is carried out without interrupting the rotation of the carousel 12.

The molding unit 14 continues its circular journey up to an exit point 52. During this journey, the container is formed by blow molding the preform 42 by means of the tube 40. The preform 48 is thus converted into a final container having the same shape as the impression 24. At the exit point 52, the mold 16 is opened so as to extract the container thus formed.

Figure 4:
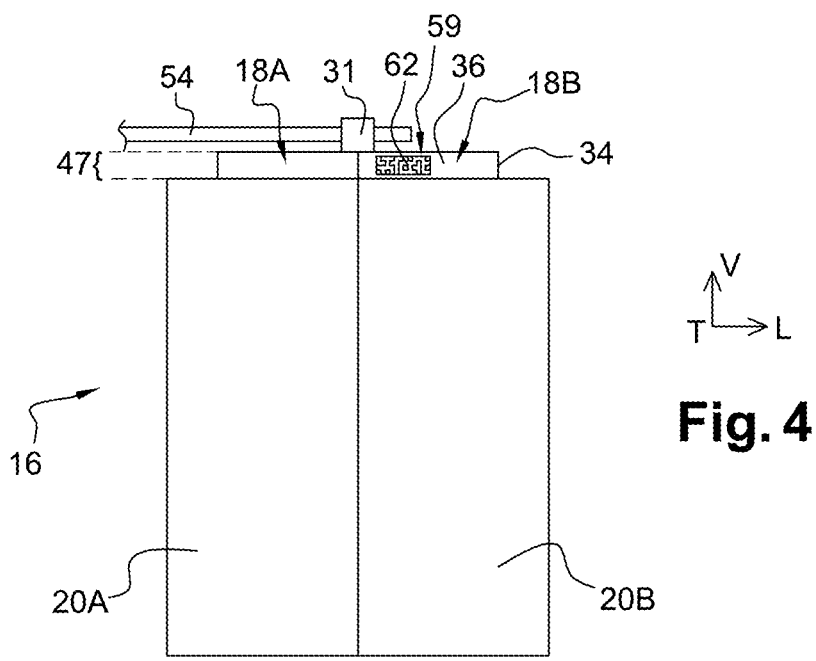
FIG. 4 is a side view that shows a molding unit of the forming station of FIG. 1 containing a container a neck of which has been picked up by a gripping pincer.

As shown in FIG. 4, the container is extracted by means of a gripping pincer 54 that is located in a plane that is horizontal on the whole, said pincer being intended to pick up the container via its neck 31. The gripping pincer 54 thus passes just above the top face 26 of the shells 18A, 18B. In case of poor adjustment, the gripping pincer 54 may rub against this top face 26.

The cycle is then reproduced for each molding unit 14. The rotation of the carousel 12 is very rapid, for example allowing several thousand containers to be produced per hour.

As explained above, it is easy to change the shape of the container to toe obtained toy replacing the shells 18A, 18B and the base 18C. Nevertheless, such a change must be accompanied by modifications of a plurality of operating parameters of the forming station 10. For example, depending on the volume of the container to be obtained, the pressure curve of the pressurized air injected into the preform 48 via the tube 40 will be different.

Apart from the fact of being able to change the shape of the final containers by replacing the shells 18A, 18B in each preparing step, the forming station 10 is designed to allow various types of containers to be produced using defined forming processes. Each type of container possesses specific structural properties that are suitable for the nature of the product that the container is intended to contain.

Some nonlimiting examples of forming processes allowing various types of containers to be obtained are given below.

According to one example of a first forming process, for producing a container intended to contain water, the shells 18A, 18B will solely be cooled by the cooling means with which the shell-holders 20A, 20B are equipped. In contrast, if the container were intended to be filled with a hot liquid, the containers obtained using this first process would see their walls retract under the effect of the heat, thus uncontrollably modifying the shape of the container.

According to one example of a second forming process, for producing a container suitable for receiving a hot liquid, it is necessary to use heated shells, able to carry out a so-called "HR" or "Hot Refill" process. Specifically, by heating the containers to a defined temperature during the forming thereof, it is possible to avoid the effect whereby the walls retract that was mentioned in the preceding paragraph. The right shells are thus equipped with heating means, such as a resistive heater.

According to one example of a third forming process, for obtaining containers having a base consisting of an extremely thin and strong wall, it is known to mount the base 18C on a holder 38 that is slidable vertically. During the forming of the container, the base 18C is thus moved vertically upward so as to stretch the material from which the base of the container is made. This type of mold is referred to as a "moule à fond boxé" in French, i.e. a mold the base of which is said to be overstroked. This allows light and inexpensive containers to be obtained.

Of course, depending on the chosen forming process, many other operating parameters of the forming station 10 must still be adjusted.

To allow the forming station 10 to be controlled, the latter is equipped with a programmable electronic control unit 56, as schematically illustrated in FIG. 1. The forming station 10 furthermore comprises a so-called human machine interface or HMI 58. This interface 58 is for example equipped with a screen and with a keyboard and/or with a touchscreen.

During a manual programming step, a human operator may select, by virtue of the interface 58, the value of a multitude of operating parameters of the forming station 10. The set of selected values is called a "recipe". The operator thus programs a recipe suitable for the type of container that he desires to obtain.

However, it is possible for, among the multitude of parameters to be managed, the human operator to select by error a value that is incompatible with the type of shell 18A, 18B with which the molds 16 are equipped. This is for example the case if the shells 18A, 18B do not comprise heating means and the operator decides to choose to implement an "HR" process. This is also the case if the operator chooses a blowing pressure that is unsuitable for the volume of the container to be obtained.

To solve this problem, the invention proposes that to the shells 18A, 18B be fastened a means 59 for permanently storing data comprising, for each parameter, values compatible with said mold. The invention thus allows the choice of available recipe values to be decreased to those that the molds actually installed in the forming station are capable of achieving.

The parameters the compatible values of which are stored for example include, nonlimitingly:
 the volume in liters of the final container;
 the height in millimeters of the final container;
 the maximum diameter of the final container;
 the forming process capable of being implemented using the mold 16, which for example takes the value "1" for a simple process, "2" for an HR process, "3" for an overstroked process, etc.;
 the maximum blowing pressure in bar.

Thus, prior to the manual programming step, and before the forming station begins production with new molds, the method for programming the electronic control unit 56 comprises a step of reading values stored in the storage means 59 using a reader 60 that automatically transmits said values to the electronic control unit 56 in order to limit the choice of values of each parameter to compatible values. Thus, in the manual, programming step, incompatible values will not be able to be selected by the operator.

Generally, the storage means 59 is formed by a multidimensional physical element; that is borne by the mold 16 and that is capable of being read by an optical reader 60. It is for example a question of a graphical element of one or two dimensions, or even of a three-dimensional part the shape of which is capable of being recognized by the optical reader 60. In the latter case, the part may be formed by one of the shells 18A, 18B.

In the examples shown in the figures, the storage means 59 is a two-dimensional barcode 62 that is borne by at least one shell 18A, 18B of the mold 16. The reader 60 is then formed by an optical reader, such as a camera that transmits the image of the two-dimensional barcode 62 to the electronic control unit 56, the latter being equipped with software means that are able to decrypt the two-dimensional barcode 62.

In the embodiment shown in FIGS. 2 to 4, the two-dimensional barcode 62 is here arranged on one of the shells 18B. The two-dimensional barcode 62 is arranged on the visible portion 47 of the shell 18B, which is intended to protrude from the shell-holder 20B.

In the example shown in the figures, this zone is hero formed by the vertical annular face 36 of the rim 34. This location combines the first advantage of always being visible when the shell 18B is mounted on the shell-holder 20B and the second advantage of being on a face that is not exposed to rubbing contrary to the top face 26. This solution is therefore particularly advantageous when the two-dimensional barcode 62 is susceptible to wear.

This is especially the case of the two-dimensional barcode 62, which here is printed on a label that is adhesively bonded to the shell 18B. The label is made of a resistant material, for example of a thick plastic equipped with a transparent protective coating. It is permanently adhesively bonded to the shell 18B. Thus, the two-dimensional barcode 62 advantageously remains adhesively bonded to the shell 18B throughout its lifetime.

As a variant (not shown) of the invention, the two-dimensional barcode is produced by altering the surface of the shell. For example, the two-dimensional barcode is etched into the surface of the shell. In this case, the two-dimensional barcode is little subject to wear and it is possible to arrange it on the top face 26 of the shell. It has been observed that this arrangement of the two-dimensional barcode on the top face 26 of the shell allows a better read-out by the reader 60. This is especially explained by the fact that the reader may be arranged above but with a transverse offset with respect to the two-dimensional barcode. This arrangement of the reader makes it possible to prevent reflections from the two-dimensional barcode from interfering with its read-out.

The two-dimensional barcode is advantageously a code of "DataMatrix" type. It is for example a question of a code that meets the standard "ECC200" of the year 2008 and managed by the organization "GS1". The reader is referred to the associated standard of the organization GS1 for more details.

Figure 5:
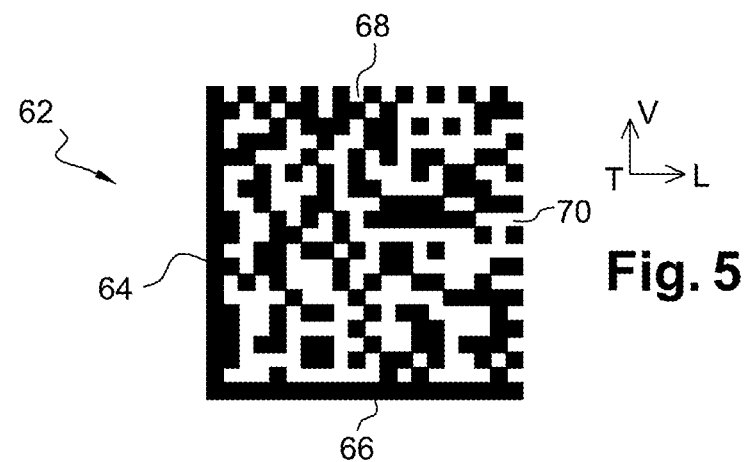
FIG. 5 is a face-on view that shows an example of a two-dimensional barcode taking the form of a square matrix array of black and white pixels.

As is illustrated in FIG. 5, such a code 62 takes the form of a square matrix array of black and white pixels. The pixels forming the left-hand edge 64 and the bottom edge 66 of the matrix array are all black so as to draw two continuous black lines that form an "L". The pixels forming the upper edge 68 and the right-hand edge 70 of the matrix array are in alternation black and white so as to draw two dotted lines.

Figure 6:
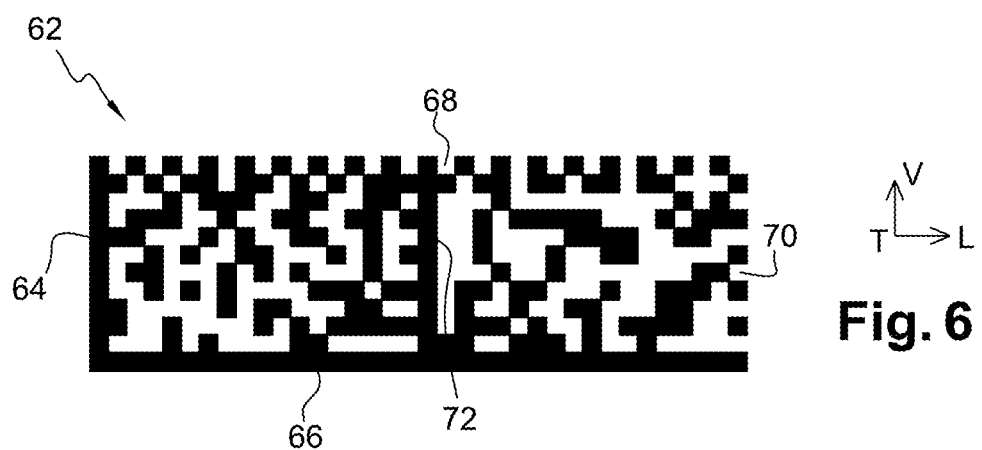
FIG. 6 is a face-on view that shows the two-dimensional barcode of FIG. 5 in the form of a rectangle formed from two horizontally juxtaposed halves of the matrix array.

The advantage of the DataMatrix code 62 is that the square matrix array may be divided horizontally into two half-squares that are then juxtaposed transversely to form a two-dimensional code of rectangular shape, as is indicated in FIG. 6. In this case, the two matrix-array halves are separated by an intermediate vertical continuous black line 72. This rectangular shape is a particularly advantageous way of allowing the two-dimensional barcode 62 to be arranged on a face as narrow as the annular face 36 of the rim 34.

Advantageously, the reader 60 is arranged on the forming station 10 so as to be able to read the two-dimensional barcode 62 after the shells 18A, 18B have been mounted on their shell-holder 20A, 20B. Thus, the stored values are read by the reader 60 when the mold 16 is installed, i.e. ready to form containers, in the forming station 10.

In the embodiment shown in FIGS. 1 and 2, the reader 60 is fixedly mounted with respect to the ground so as to foe able to take an image of the two-dimensional barcode 62 of each mold 16 on the fly during the rotation of the carousel 12.

As a variant (not shown) of the invention, each molding unit 14 is equipped with an individual reader 60 that is located on board the carousel 12. Thus, there are as many readers 60 as there are molding units 14.

According to another variant of the invention, the reader 60 is arranged to read the two-dimensional barcode 62 before the shells 18A, 18B are mounted on their shell-holder 20A, 20B. It is for example a question of a manual reader 60 that is manipulated by an operator.

The invention thus allows human errors during programming of the electronic control unit 56 to be limited by limiting the choice of each defined parameter to values compatible with the type of mold 16 installed in the forming station 10.

Furthermore, by reading the two-dimensional barcodes 62 of each mold 16, the electronic control unit 56 may instantaneously detect whether all the molds 16 installed in the blowing station 10 are of the same type. This thus makes it possible to detect whether a mold 16 of a different type from the others is installed in the forming station 10.

Moreover, a two-dimensional barcode 62 borne by one mold 16 may be unreadable. In this case, the electronic control unit 56 may be programmed to consider this mold 16 to be of the same type as the other molds 16 installed in the forming station 10.

The invention claimed is:

1. A method for assisting with the programming of an electronic unit (56) for controlling a forming station (10),
   the forming station (10) comprising molding units (14) each of which bears an interchangeable mold (16) for producing containers by blow molding preforms,
   the method comprising a manual programming step consisting in selecting a value for defined operating parameters via an interface (58) for inputting data into the electronic control unit (56),
   wherein each mold (16) has fastened thereto a storage component (59) for permanently storing data comprising values compatible with said mold (16) for each defined parameter, the method comprising a prior step of reading the values stored in the storage component (59) using a reader (60) that automatically transmits said values to the electronic control unit (56) in order to limit the choice of values of each parameter to compatible values.

2. The method as claimed claim 1, wherein the storage component (59) is a multidimensional physical element that is borne by the mold (16) and that is capable of being read by an optical reader (60).

3. The method as claimed in claim 2, wherein the storage component (59) is a two-dimensional barcode (62) that is borne by the mold (16) and that is capable of being read by an optical reader (60).

4. The method as claimed in claim 3, wherein the storage component (59) is a code (62) according to the standard "GS1 DataMatrix ECC200".

5. The method as claimed in claim 1, wherein the reader (60) is arranged on the forming station (10).

6. The method as claimed in claim 1, wherein the stored values are read by the reader (60) when the mold is installed in the forming station (10).

7. The method as claimed in claim 2, wherein the reader (60) is arranged on the forming station (10).

8. The method as claimed in claim 2, wherein the stored values are read by the reader (60) when the mold is installed in the forming station (10).

9. The method as claimed in claim 3, wherein the reader (60) is arranged on the forming station (10).

10. The method as claimed in claim 3, wherein the stored values are read by the reader (60) when the mold is installed in the forming station (10).

11. The method as claimed in claim 4, wherein the reader (60) is arranged on the forming station (10).

12. The method as claimed in claim 4, wherein the stored values are read by the reader (60) when the mold is installed in the forming station (10).

\* \* \* \* \*